May 12, 1931.  K. HOFFMANN  1,804,501
ADJUSTING KNOB FOR FRAMING DEVICES
Filed Jan. 25, 1927
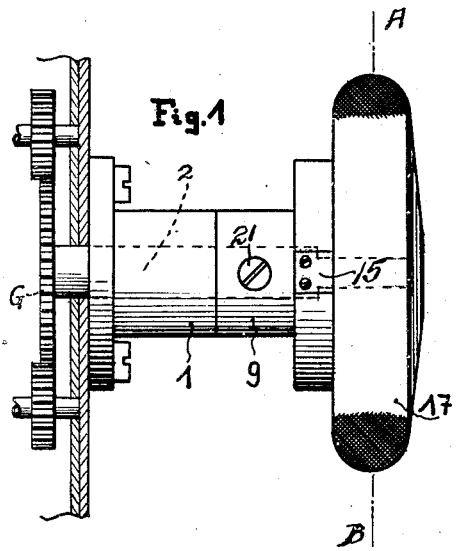
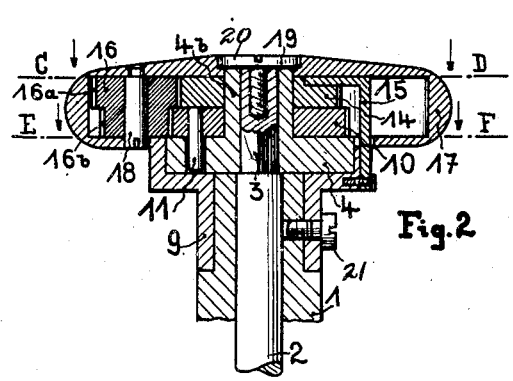
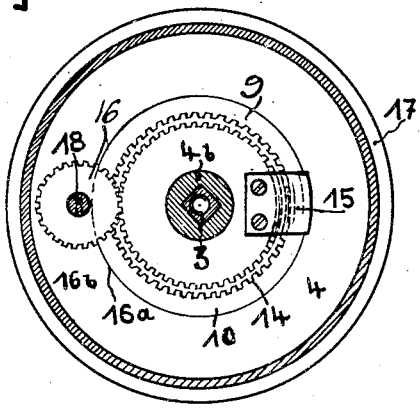
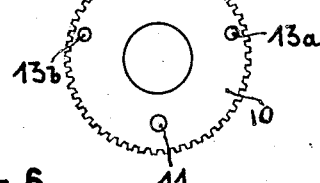
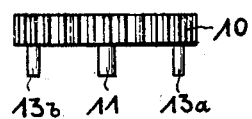
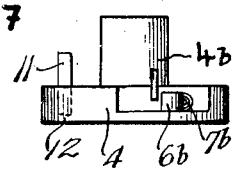
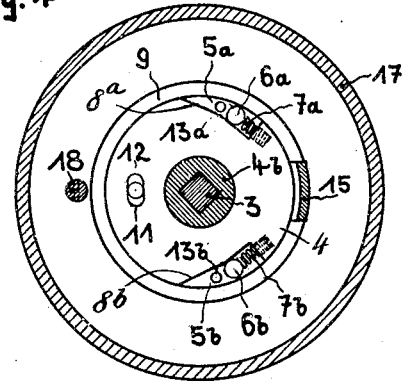
Inventor:
By Kurt Hoffmann
William C. Linton.
Attorney.

Patented May 12, 1931

1,804,501

UNITED STATES PATENT OFFICE

KURT HOFFMANN, OF DRESDEN, GERMANY

ADJUSTING KNOB FOR FRAMING DEVICES

Application filed January 25, 1927, Serial No. 163,471, and in Germany and France March 23, 1926.

The present invention relates to cinematographic projecting apparatuses and more particularly to an adjusting mechanism for the framing device thereof. In many of the now prevalent types of framing devices a driven shaft is provided whereby motion may be transmitted to the film gate or sprocket wheel of the projector in order to adjust the film with respect to the picture window of the film gate for causing the picture to be properly framed upon the screen.

The primary object of the invention is to provide a compact adjusting mechanism capable of being arranged in a suitable knob or handle and the latter being applicable to the drive shafts of several of the now prevailing types of framing devices used in connection with moving picture machines.

Another equally important object of the invention is to provide an adjusting knob or drive device of the character aforesaid whereby the framing mechanism will be automatically retained or locked against accidental movement when the adjusting device is at rest and one in which the framing mechanism will be automatically released upon operation of the adjusting device.

Other objects of the invention will be in part obvious and in part pointed out hereinafter.

In order that the invention and its mode of operation may be readily understood by those skilled in the art to which it appertains, I have in the accompanying illustrative drawings and in the detailed following description based thereupon, set out one possible embodiment of my invention.

In these drawings:

Figure 1 is a side elevation of the knob or handle embodying the invention and applied to an ordinary moving picture machine, Figure 2 is a transverse section through the same when the knob is in a vertical position.

Figure 3 is a horizontal section taken on the line C—D of Figure 2 in the direction of the arrows as shown, Figure 4 is a similar view taken on the line E—F of Fig. 2, Figure 5 is a detailed plan view of one of the driving gears, Figure 6 is a side elevation of the same, and Figure 7 is a side elevation of the clutch carrying disc.

Referring now more particularly to the accompanying drawings wherein like and corresponding parts are designated by similar reference characters throughout, I have illustrated a portion of an ordinary moving picture machine casing C having arranged therein any desired form of framing device which latter is provided with a drive shaft 2 projecting from one side of the casing C. By rotating this drive shaft in either direction motion will be transmitted to the main gearing G of the framing device for actuating the latter and in order that this shaft 2 may be manually adjusted I provide a handle or knob therefor.

Secured to the projector casing C in any suitable manner or by the set screws, as shown, is a bearing bracket 1 through which extends the shaft 2. The outer end of this bracket is reduced and fixed thereto by the set screw 21 is the sleeve portion of a stationary casing or section 9 of the knob or handle. Rotatably connected by means of the set screw 20 to the outer extremity of the shaft 2 is the outer hollow casing or section 17 of the knob. The outer end 3 of the shaft 2 is of a squared cross section and is receivable within a sleeve or bearing 4b of a clutch disc 4. This disc 4 is seated within the fixed casing 9 but is free to rotate therein with the shaft 2, and to limit the rotation of the disc 4 with respect to the casing 9, I provide a clutch therebetween. This clutch consists of two balls or rollers 6a and 6b each arranged within a recess 5a or 5b formed within the outer periphery of the disc 4. These recesses are each so formed that the base portion thereof is of greater width than the diameter of the roller seated therein, but the outer or opposite end 8a or 8b of each recess is of less width than the diameter of the roller therein. Expansible coiled springs 7a and 7b are carried by the disc and one projects within each recess in order to normally force the roller within that recess towards the outer or narrow end thereof whereat the rollers will effect a wedging action between the disc and inner wall of the fixed casing 9 whereby the disc will be locked to the casing 9 and the shaft 2 retained against rotation.

A planetary gearing is herein shown for establishing a drive connection between the casing 17 and the shaft 2 or disc 4 keyed thereto. This gearing consists of a double pinion 16 rotatably supported by a shaft 18 within the casing 17 and this pinion has two sets of gear teeth 16a and 16b. Freely mounted upon the bearing sleeve 4b is a gear wheel 10 the teeth of which mesh with the gear teeth 16b of the pinion, whereas a stationary gear 14 surrounds the sleeve 4b and meshes with the teeth 16a of the pinion. This gear wheel 14 is retained stationary by connecting the same to the fixed casing 9 by means of the bracket 15 in the manner as shown in Figures 2 and 3. Depending from and secured to the lower face of the gear wheel 10 are three pins one of which indicated by the numeral 11 is seated within an enlarged recess or opening 12 formed within the disc 4 whereas the other pins 13a and 13b project within a recess 5a or 5b. From this construction it is obvious that when the gear 10 starts to rotate in either direction the pin 11 will be free for a slight movement within the enlarged opening 12 of the disc 4 or until one of the pins 13a or 13b releases the roller wedged between the disc and stationary casing 9. After such roller has been released the pin 11 will contact with the disc 4 and cause the same to rotate with the gear 10. During rotation of the gear 10 in a clockwise direction the pin 13a will contact with the roller 6a and force the same against the tension of the spring 7a within the enlarged end of the recess 5a whereat the wedging action caused by the roller 6a between the disc 4 and casing 9 will be released and at the same time the rotation of the disc 4 will cause the roller 6b to roll within the enlarged end of the recess 5b, against the action of the spring 7b. When the gear 10 comes to a complete stop pressure upon the coiled springs 7a and 7b is released and the rollers are again forced into a wedging contact between the disc 4 and casing 9 whereby the disc and shaft 2 connected thereto will be retained against rotation until power is again supplied to the gear 10.

*Modus operandi.*—This adjusting knob or handle may be applied to any of the now prevailing types of moving picture machines having a support or casing C and a projecting drive shaft 2 of the framing mechanism therefore by first securing to the casing C the bearing bracket 1 and then attaching to this bearing bracket 1 the fixed casing 9 of the knob. The clutch disc 4 is then placed over the square end of the shaft 2 so that the clutch members will be seated within the casing 9. The rotatable casing 17 having the transmission gearing therein is placed in position about the bearing sleeve of the disc 4 and the casing 9 is secured to the shaft 2 by the set screw 19. The operator by turning the casing 17 will transmit motion to the shaft 2 through gearing as has been previously described whereby the shaft 2 may be rotated in either direction and in so rotating the shaft 2 the framing mechansm will be brought into play whereat the film may be adjusted with respect to the film gate opening in order that the proper framing of the picture upon the screen will be effected. The jerky vibrations arising from the film drive mechanism of the projector ofttimes causes the picture to be projected out of frame, but owing to the clutch connection between the shaft 2 and the fixed casing 9 the framing devices will be locked against such accidental movement. From a consideration of Figure 4 it will be noted that when the disc 4 is at rest or no movement transmitted thereto through the knob 17 should the shaft 2 attempt to rotate in either direction, one of the rollers 6a or 6b will be moved within the narrow portion of its recess where it will be wedged between the disc 4 and the casing 9 for holding the shaft 2 against such rotation and likewise the framing mechanism retained in its adjusted position. By turning the knob 17 motion will be transmitted to the gear 10 whereby the pins 13a and 13b will release the rollers from their wedged position and permit the disc 4 to travel with the gear 10 by contact of the pin 11 with the disc so that the shaft 2 will be caused to rotate upon movement of the knob 17. During the rotation of the disk 4 by the knob 17 one of the pins 13a or 13b will act to retain its respective roller within the larger end of its recess, while the remaining roller will be simultaneously pushed into the larger portion of its respective recess by the component of force from the relative rotation of the disk with respect to the stationary section 9. Consequently, it will be understood that as long as the disk is being so rotated, the clutch will be disengaged but when the knob is at rest, the clutch will be automatically engaged.

I claim:

1. The combination with a moving picture machine having a rotatable shaft of the framing mechanism therefor, an adjusting mechanism for said shaft, releasable means for retaining said shaft against accidental movement and means for operatively connecting said adjusting mechanism with said retaining means to release the latter when said adjusting mechanism is operated.

2. An adjusting mechanism for the rotatable shafts comprising a stationary member, a rotatable member, transmission gearing for connecting said rotatable member to the shaft, a clutch arranged between said stationary member and the shaft and means operable by said rotatable member for releasing said clutch during the rotation of the shaft by said rotatable member.

3. An adjusting mechanism for rotatable shafts comprising a stationary casing, a rotatable casing, a transmission gearing arranged within said rotatable casing, a disc carried by the shaft, a clutch arranged between said disc and stationary casing for normally holding said disc against rotation, means for operatively connecting said gearing to said disc and means whereby said gearing is rotated said clutch will be released and the shaft caused to revolve with said gearing.

4. An adjusting mechanism for rotatable shafts comprising a fixed casing, a rotatable casing, planetary gearing arranged within and operable by said rotatable casing, a disc connected to the shaft, a clutch arranged between said disc and stationary casing for retaining the shaft against rotation, means operable by said gearing for releasing said clutch and means for connecting said disc to said gearing when said clutch is released whereby said shaft may revolve with said gearing.

5. A knob for adjusting rotatable shafts of the framing mechanism of motion picture machines, comprising a fixed casing, a rotatable casing, means for operatively connecting said rotatable casing to the shaft, means arranged within said stationary casing for retaining the shaft against rotation, and means operable by said rotatable casing for releasing said retaining means.

6. An adjusting means for rotatable shafts comprising a stationary casing, a disc connected to said shaft and arranged within said casing, a gear wheel rotatable about said shaft and operatively connected to said disc, a knob rotatably secured to the shaft, a stationary gear connected to said casing and a pinion carried by said knob and meshing with said gears whereby upon rotation of said knob the shaft will be caused to revolve therewith.

7. The combination with a bearing bracket adapted to be secured to a moving picture machine housing and a picture framing shaft extending therethrough and projecting therefrom, a casing fixedly secured to said bracket, a disc secured to said shaft and arranged within said casing, a knob rotatably mounted upon the outer end of said shaft, a transmission gearing connecting said knob with said disc, clutch members arranged between said casing and disc for locking the latter against rotation in either direction and means controlled by said gearing for releasing said clutch members when said knob is rotated.

8. An adjusting means comprising in combination, a rotatable shaft, a bearing bracket therefor, a fixed casing secured to said bracket, an annular flange formed with said casing, a disc carried by said shaft and arranged within said annular flange, said disc having recesses formed in the periphery thereof, spring actuated rollers arranged within said recesses adapted, at times, to frictionally engage said flange, a gear wheel operatively connected to said disc, pins extending from said gear wheel and projecting within the recesses of said disc whereby with rotation of said gear wheel, said rollers will be moved out of frictional engagement with said flange, a handle rotatably secured to said shaft and means for operatively connecting said handle to said gear wheel whereby with rotation of said handle said shaft will be caused to rotate therewith.

In testimony whereof I affix my signture.

KURT HOFFMANN.